US006880012B1

(12) United States Patent
Grimes et al.

(10) Patent No.: US 6,880,012 B1
(45) Date of Patent: Apr. 12, 2005

(54) SYSTEM, METHOD, AND PROGRAM FOR ESTABLISHING MODEM COMMUNICATION BETWEEN A MASTER COMPUTER SYSTEM AND A PLURALITY OF SLAVE COMPUTER SYSTEMS THROUGH A COMMON SERIAL COMMUNICATION CHANNEL

(75) Inventors: Benjamin Russell Grimes, Zebulon, NC (US); Jillian Lynn Kaufman, Raleigh, NC (US); Edward Stanley Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 09/630,912

(22) Filed: Aug. 2, 2000

(51) Int. Cl.[7] .............................................. G06F 15/16

(52) U.S. Cl. ........................ 709/227; 709/229; 709/209

(58) Field of Search ................................ 709/227, 229, 709/209, 208, 210, 211, 228

(56) References Cited

U.S. PATENT DOCUMENTS

| 4,258,236 A | | 3/1981 | Conklin et al. | |
|---|---|---|---|---|
| 4,385,384 A | | 5/1983 | Rosbury et al. | |
| 4,425,625 A | | 1/1984 | Seligman et al. | |
| 4,850,008 A | | 7/1989 | Berg et al. | |
| 5,001,744 A | | 3/1991 | Nishino et al. | |
| 5,040,209 A | | 8/1991 | Greenberg et al. | |
| 5,481,750 A | * | 1/1996 | Parise et al. ................. | 709/220 |

(Continued)

FOREIGN PATENT DOCUMENTS

| JP | 04096541 A | * | 3/1992 | ............ | H04L/12/40 |

OTHER PUBLICATIONS

IBM Technical Disclosure Bulletin, "Low–Cost Remote Diagnostics of Computing Devices," vol. 31, No. 1, Jun. 1988, pp. 407–410.
IBM Technical Disclosure Bulletin, "Detecting Incoming Voice, Data, or Fax Telephone Calls," vol. 38, No. 10, Oct. 1995, pp. 389–390.

Primary Examiner—Le Hien Luu
(74) Attorney, Agent, or Firm—Martin J. McKinley; Dillon & Yudell LLP

(57) ABSTRACT

A system, method, and program for establishing modem communication between a master computer system and a plurality of slave computer systems coupled to a common serial communication channel are disclosed. An unique identification number (UIN) is assigned to each slave computer system. The slave system modems are initialized to a "receive mode." The master computer system directs a session request to the slave computer systems through the common serial communication channel. All slave computer systems receive and respond to the session request by changing each of the modems to the "answer mode." After all the slave computer systems respond, the master computer system requests communication with a particular slave computer system among the plurality of slave computer systems. The master computer system uses the UIN to establish communication with the particular slave computer system by sending a request from the master computer system specifying the UIN of the particular slave computer system. After the master computer system requests communication with the particular slave computer system, communication is maintained between the master computer system and only the particular slave computer system by maintaining the modem for the particular slave computer system in the "answer mode" and switching the modems for all other slave computer systems to the "receive mode." After communication is established between the master computer system and the particular slave computer system, the master computer system controls the particular slave computer system by issuing commands.

10 Claims, 4 Drawing Sheets

U.S. PATENT DOCUMENTS 5,666,403 A     9/1997   Telibasa
5,809,111 A     9/1998   Matthews
5,809,118 A     9/1998   Carmello et al.
5,815,660 A  *  9/1998   Momona .................... 709/208
5,841,842 A     11/1998  Baum et al.
5,917,808 A  *  6/1999   Kosbab ...................... 370/254
6,611,860 B1 *  8/2003   Ying .......................... 709/208

* cited by examiner

SYSTEM, METHOD, AND PROGRAM FOR ESTABLISHING MODEM COMMUNICATION BETWEEN A MASTER COMPUTER SYSTEM AND A PLURALITY OF SLAVE COMPUTER SYSTEMS THROUGH A COMMON SERIAL COMMUNICATION CHANNEL

BACKGROUND OF THE INVENTION

1. Technical Field

The present invention relates in general to data processing systems, and, in particular, to a system, method, and program for establishing communication among data processing systems. Still more particularly, the present invention relates to a system, method, and program for establishing modem communication between a master computer system and a plurality of slave computer systems through a common serial communication channel.

2. Description of the Related Art

A data processing system typically includes a system processor, a memory system, and an input/output ("I/O") controller. The data processing system may be coupled in communication with another data processing system. Two data processing systems communicate by coupling a communication device, such as a modem, to the I/O controller of each data processing system and linking the communication devices or modems together through a serial communication channel, such as a telephone line or a wireless communication channel. Interconnect among these devices is usually accomplished using a public switch telephone network.

In one application, the two data processing systems are coupled in communication with each other so that one data processing system directs and executes commands to the other data processing system. For example, one data processing system may be a master computer system that includes at least a master system processor, a master memory system, and a master I/O controller. The other data processing system may be a slave computer system which includes at least a slave system processor, a service processor, a slave memory system, and a slave I/O controller. The service processor is a dedicated special-purpose processor that serves as a full time hardware and software system monitor during the operation of the slave computer system. The service processor monitors the environmental status of the slave computer system and executes various operational or maintenance routines, such as re-configuration of the slave system processor or the slave computer system, execution of the slave computer system under a different configuration, or analysis of performance of the slave computer system and components or subsystems of the slave computer system. The master computer system is coupled in communication with the slave computer system so that the master system processor is able to direct commands from the master computer system to execute various routines by the service processor at the slave computer system.

When the data processing system is coupled in communication with a plurality of other data processing systems, a separate serial communication channel (e.g., phone line or wireless channel) exists between the data processing system and each of the other data processing systems. However, a plurality of serial communication channels for communicating between the data processing system and each of the various other data processing systems means that the use of a larger amount of communication resources is required. The communication resources are expensive and are not generally used on a regular basis.

In order to reduce expenses and a large amount of communication resources, a single communication channel can be used. The single communication channel couples the data processing system to a centralized hardware box, and the various other data processing systems are also able to couple in communication with the centralized hardware box through a communication switch. The centralized hardware box manages the communication between the data processing system and one of the other data processing systems. Normally, this communication management is done manually requiring an operator to be present. If it is done electronically, then the data processing system initiates a session request or call for a particular data processing system to which the data processing system requests to communicate by sending an indication, such as a certain type of telephonic ring or distinguishing signal, to the centralized hardware box through the single communication channel. The centralized hardware box controls the switch to activate the communication between the data processing system and the requested particular data processing system by switching on the communication channel between the centralized hardware box and the particular data processing system. The existence of the centralized hardware box, however, results in the use of additional hardware and adds to the expense for providing communication between the data processing systems. The present invention recognizes the need and desire to eliminate hardware and reduce expenses associated with providing communication and manual intervention between data processing systems.

SUMMARY OF THE INVENTION

A system, method, and program for establishing modem communication between a master computer system and a plurality of slave computer systems coupled to a common serial communication channel are disclosed. An unique identification number is assigned to each of the slave computer systems. Modems of the slave computer systems are initialized to a "receive mode." The master computer system directs a session request to the slave computer systems through the common serial communication channel. The plurality of slave computer systems receive and respond to the session request by changing each of the modems to the "answer mode."

After the slave computer systems respond, the master computer system requests communication with a particular slave computer system among the plurality of slave computer systems. The master computer system uses the unique identification number to establish communication with the particular slave computer system by sending a request from the master computer system specifying the unique identification number of the particular slave computer system. After the master computer system requests communication with the particular slave computer system, communication is maintained between the master computer system and only the particular slave computer system by maintaining the modem for the particular slave computer system in the "answer mode" and switching the modems for all other slave computer systems to the "receive mode." After communication is established between the master computer system and the particular slave computer system, the master computer system controls the particular slave computer system by issuing commands to obtain the information.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention discloses a system, method, and program for establishing communication between data processing systems. The present invention also discloses a system, method, and program for establishing modem communication between a master computer system and a plurality of slave computer systems coupled to a common serial communication channel. The present invention is not in any way limited to data processing systems or computer systems that are master computer systems or slave computer systems, but the present invention may be implemented with all suitable data processing systems or computer systems.

Figure 1:
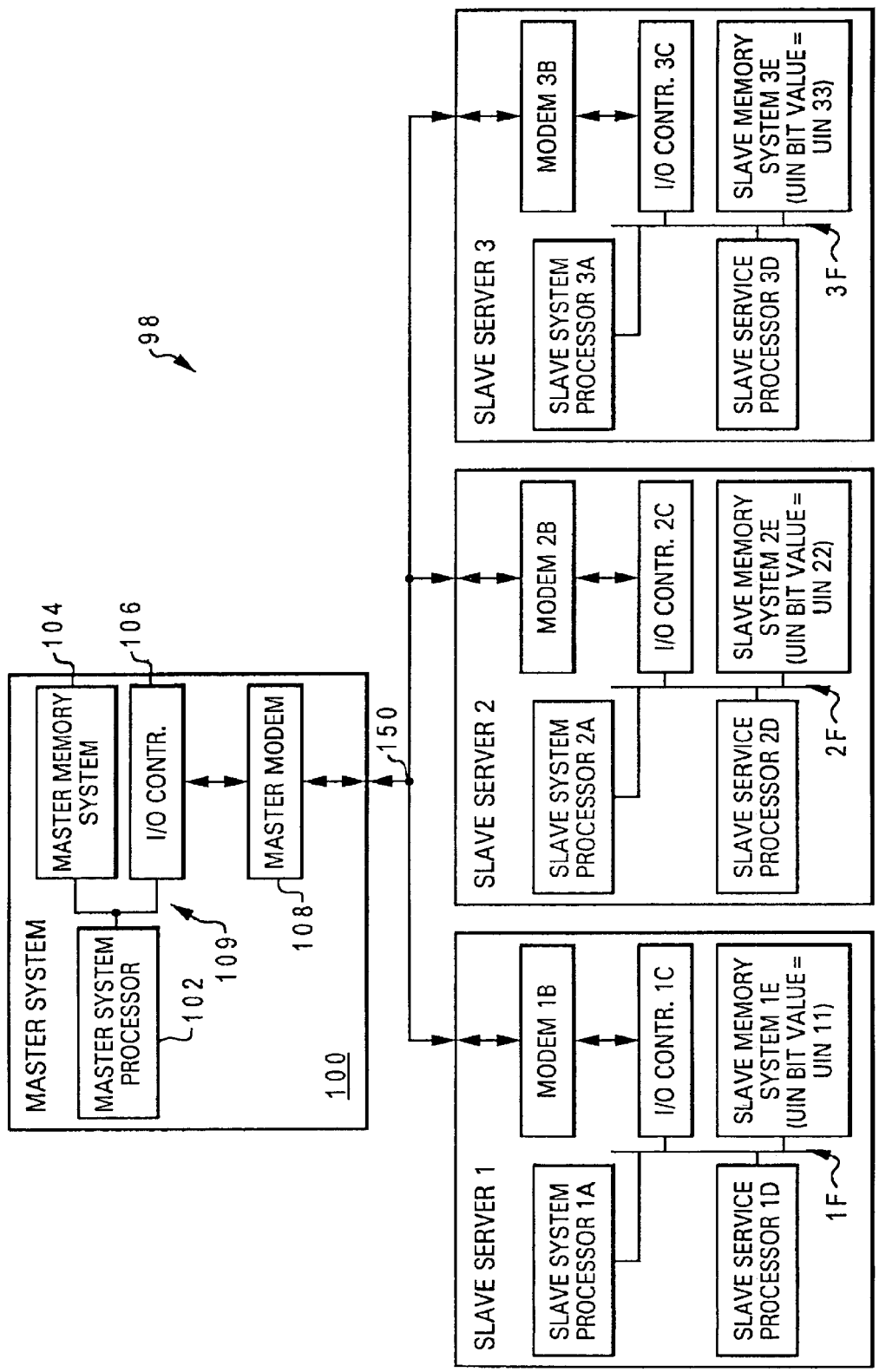
FIG. 1 is an exemplary block diagram of hardware for an overall system that includes a master computer system that establishes communication with a particular one of a plurality of slave computer systems in accordance with the present invention.

With reference now to FIG. 1, an exemplary block hardware diagram of an overall system 98 that includes a master computer system ("master system") 100 establishing communication with a particular one among a plurality of slave computer systems ("slave servers") 1, 2, and 3 through a common communication channel 150 in accordance with the present invention is shown. Master system 100 is coupled to common communication channel 150, such as a serial communication channel. Exemplary communication channels include a telephone line for telephonic communication and a wireless channel for wireless communication. Common communication channel 150 is further coupled to slave servers 1, 2, and 3.

Master system 100 includes at least a master system processor 102, a master memory system 104, an input/output controller ("I/O contr.") 106, and a master modem 108. Master system processor 102, master memory system 104, and I/O controller 106 are attached to bus 109 to enable communication therebetween, and master modem 108 is coupled to I/O controller 106. Common communication channel 150 is coupled to master modem 108.

Slave server 1 has at least a slave system processor 1A, a modem 1B, an I/O controller 1C, a slave service processor 1D, and a slave memory system 1E. Slave system processor 1A, slave service processor 1D, I/O controller 1C, and slave memory system 1E are coupled to a bus 1F to provide bus communication between these components. Slave server 1 is coupled to master system 100 through modem 1B and common communication channel 150. As shown in FIG. 1, slave servers 2 and 3 are similarly configured.

Figure 2:
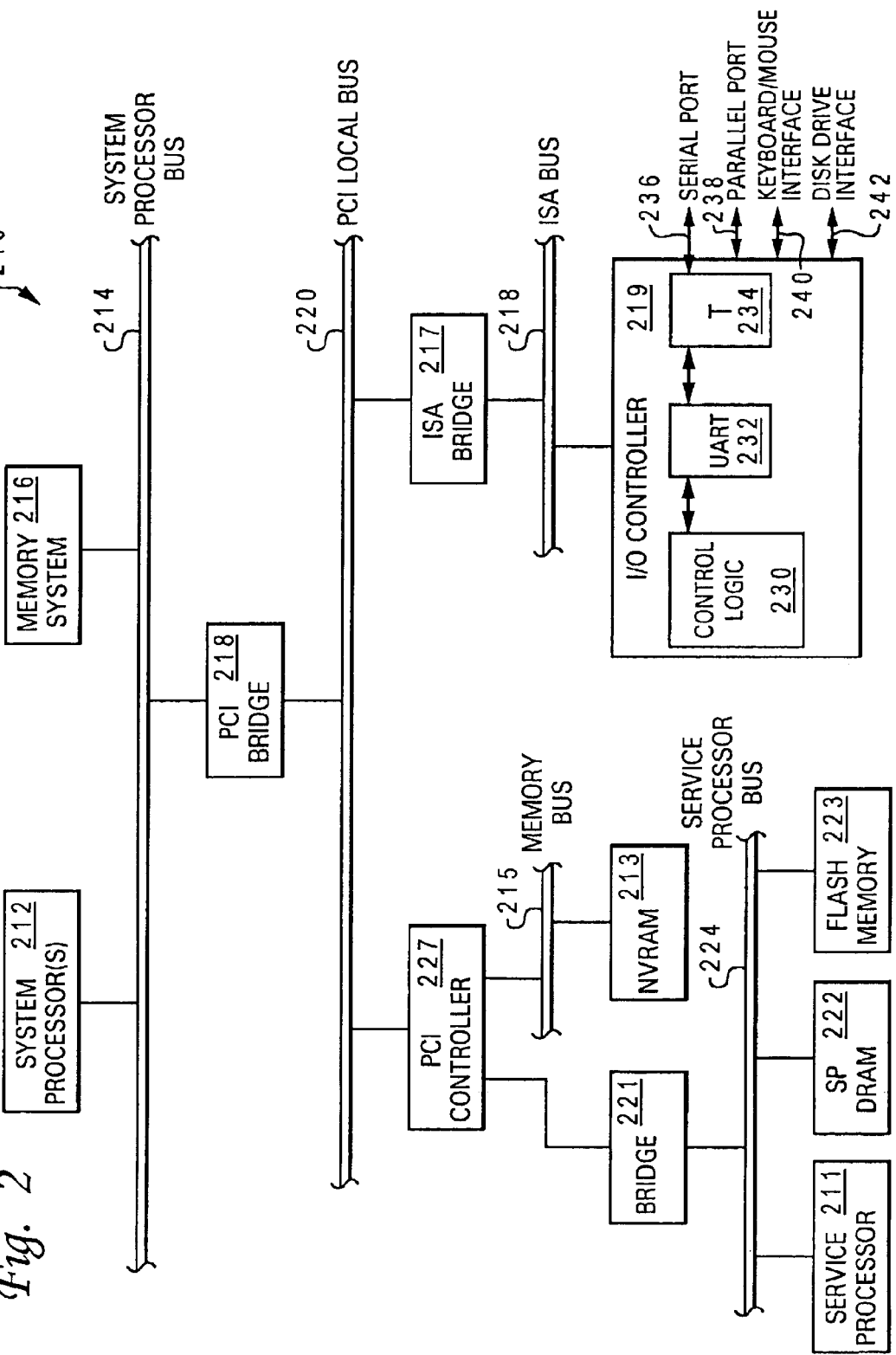
FIG. 2 is an exemplary block diagram of a data processing system, which may be the master computer system or one of the slave computer systems in FIG. 1, that is used to implement the present invention.

Referring now to FIG. 2, an exemplary block diagram of a data processing system 210, which may be master system 100 or slave computer system 1, 2, or 3 in FIG. 1, is shown. The illustrative embodiment depicted in FIG. 2 is a workstation or server computer system such as the RS/6000® manufactured by International Business Machines Corporation (IBM) of Armonk, N.Y.; however, as will become apparent from the following description, the present invention is also applicable to other data processing systems.

As illustrated in FIG. 2, data processing system 210 (e.g., master system 100 or slave server 1, 2, or 3) includes at least one system processor 212 (e.g., master system processor 102 or slave system processor 1A, 2A, or 3A), which is coupled to processor bus 214. System processor 212, which may comprise one of the PowerPC™ line of processors produced by IBM an Intel processor, etc., is a general-purpose processor that processes data under the control of an operating system and application software stored in memory system 216 (e.g., master memory system 104). System processor 212 is coupled via processor bus 214 and host Peripheral Component Interconnect (PCI) bridge 218 to PCI local bus 220.

Communication on PCI local bus 220 is governed by local PCI controller 227, which is in turn coupled to a non-volatile random access memory (NVRAM) 213 via a memory bus 215. Local PCI controller 227 is further coupled via a second host bridge 221 and a service processor bus 224 to a service processor 211 (e.g., slave service processor 1D, 2D, and 3D). Service processor 211 is a dedicated special-purpose processor that serves as a full-time hardware and software system monitor during the operation of data processing system 210. The functionality of service processor 211 is governed by system monitoring software stored in a service processor dynamic random access memory (SP DRAM) 222. At startup, service processor 211 boots from code in a flash memory 223. Flash memory 223 also stores system firmware that is executed by system processor 212 at startup prior to the loading of the operating system.

Data processing system 210 further includes an Industry Standard Architecture (ISA) bus 218, which is coupled to PCI local bus 220 by ISA bridge 217. Coupled to ISA bus 218 is an input/output (I/O) controller 219 (e.g., I/O controller 106, 1C, 2C, or 3C), which controls communication between data processing system 210 and attached peripheral devices such as a keyboard or mouse via a keyboard/mouse interface 240 and a disk drive through a disk drive interface 242. In addition, I/O controller 219 supports external communication by data processing system 210 via a serial port 236 and a parallel port 238. A modem, such as modem 108, 1B, 2B, or 3B, can also be attached to I/O controller 219.

I/O controller 219 includes a control logic 230, a dedicated system universal asynchronous receiver transmitter (UART) 232, and a transmitter ("T") 234. U.S. patent application Ser. No. 09/046,837 entitled (IBM Docket No. AT9-98-010) "METHOD AND SYSTEM FOR SHARING A SINGLE UNIVERSAL ASYNCHRONOUS RECEIVER TRANSMITTER (UART) AMONG MULTIPLE RESOURCES IN A DATA PROCESSING SYSTEM" filed on Mar. 24, 1998, which is assigned to International Business Machines ("IBM") of Armonk, N.Y., discloses such an exemplary I/O controller. UART 232 converts data received from control logic 230 from parallel format into serial format for communication via serial port 236 and converts data received from serial port 236 from serial format into parallel format prior to passing the received data to control logic 230. Transceiver ("T") 234 adjusts the voltage levels of in-coming and out-going signals to comply with the voltage specifications of data processing system 210 and the selected serial communication protocol (e.g., RS-232). Of course, depending upon design considerations, I/O controller 219 may include additional serial ports, each having a single associated UART and transceiver. Transceiver 234 has an enable input coupled to service processor 211. By asserting and deasserting the enable inputs of transceiver 234, service processor 211 determines which of service processor 211 and system processor 212 is able to transmit and receive data via serial port 236. I/O controller 219 may just as easily be attached to the service processor bus 224.

Figure 3A:
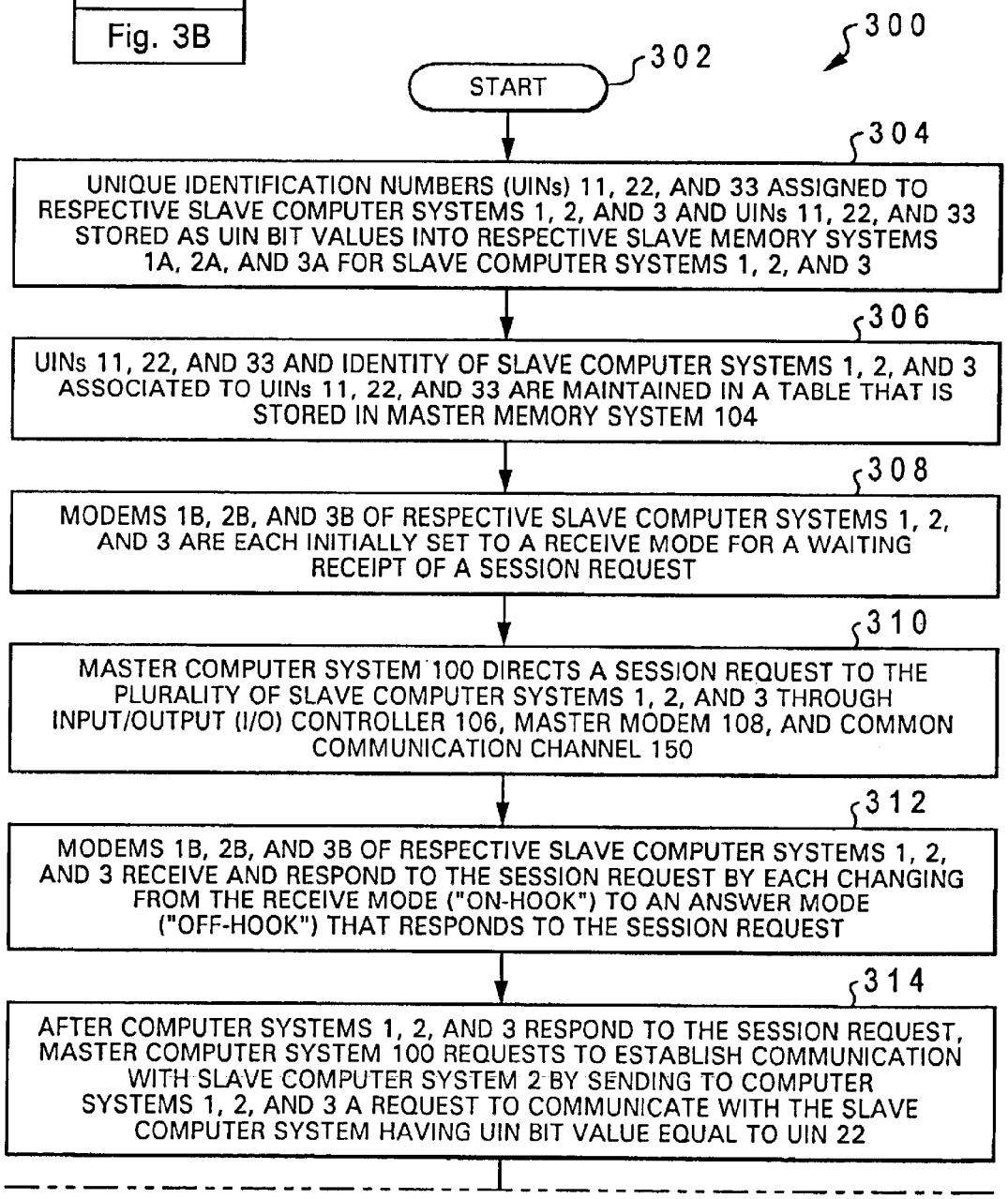
FIG. 3 is a flow chart of an exemplary method and program executed by the overall system of FIG. 1 to establish communication between the master computer system and a particular slave computer system in accordance with the present invention.
Figure 3B:
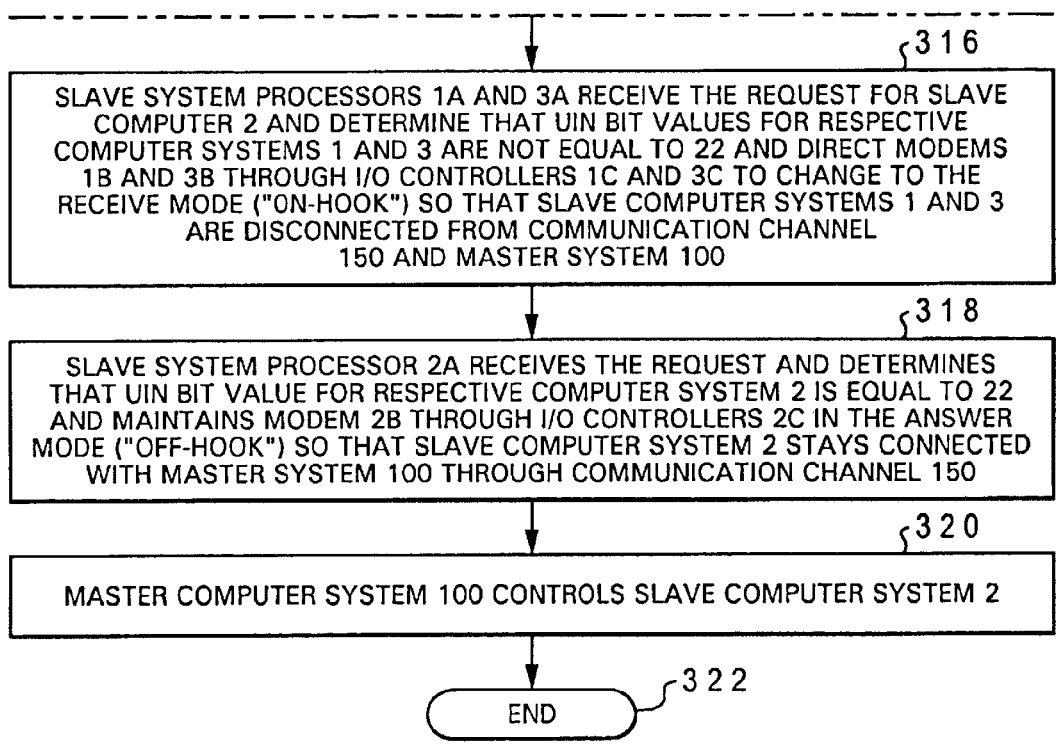

With reference now to FIG. 3, a flow chart of an exemplary method 300 and program executed by overall system 98 of FIG. 1 for establishing communication between master system 100 and a particular one slave server among slave servers 1, 2, and 3 in accordance with the present invention is shown. Exemplary method 300 discloses an example in which communication is established between master system 100 and slave server 2. However, exemplary method 300 is not in any way limited to establishing communication between master system 100 and slave server 2, and exemplary method 300 may be implemented and executed to establish communication between any suitable data processing system and another suitable data processing system.

Exemplary method 300 starts at block 302 and then proceeds to block 304, which shows the assignment unique identification numbers (UINs) 11, 22, and 33 to respective slave servers 1, 2, and 3. UINs 11, 22, and 33 are stored as UIN bit values in respective slave memory systems 1A, 2A, and 3A, which may be non-volatile random access memories ("NVRAMs"), for slave servers 1, 2, and 3. Method 300 then moves to block 306, which represents master system 100 storing UINs 11, 22, and 33 in association with the identities of the associated slave, for example, servers 1, 2, and 3 in a table within mastern master memory system 104 of master system 100. Following block 306, block 308 depicts modems 1B, 2B, and 3B of respective slave servers 1, 2, and 3 are each initially set to a "receive" mode (e.g., "on-hook" mode) while awaiting receipt of a session request.

Method 300 next moves to block 310, which illustrates master system 100 directing a session request to the plurality of slave servers 1, 2, and 3 through I/O controller 106, master modem 108, and common communication channel 150. Following block 310, block 312 shows modems 1B, 2B, and 3B of respective slave servers 1, 2, and 3 receive and respond to the session request by each changing from the receive mode to an "answer" mode (e.g., "off-hook" mode) that responds to the session request. Method 300 then proceeds to block 314, which represents that, after slave servers 1, 2, and 3 respond to the session request, master system 100 requests to establish communication with slave server 2 by sending to slave servers 1, 2, and 3 a request to communicate with the slave server having UIN bit value equal to UIN 22. Method 300 next moves to block 316, which shows slave system processors 1A and 3A receiving the request for slave server 2 and determining that UIN bit values for respective slave servers 1 and 3 are not equal to 22. Block 314 further shows slave system processors 1A and 3A directing modems 1B and 3B through I/O controllers 1C and 3C to change to the "receive" mode ("on-hook" mode) so that slave servers 1 and 3 are disconnected from communication channel 150 and master system 100.

Following block 316, block 318 depicts slave system processor 2A receiving the request and determining that UIN bit value for respective slave server 2 is equal to 22. Block 318 further illustrates modem 2D being maintained in the answer mode (off-hook mode) through I/O controller 2C so that slave server 2 stays connected with master system 100 through communication channel 150. Method 300 proceeds to block 320, which shows master system 100 controlling slave server 2, for example, to configure the performance monitoring of slave system processor, assign a particular task, etc. Method 300 finally ends at block 322.

A system, method, and program for establishing communication between data processing systems are disclosed. The present invention discloses in detail a system, method, and program for establishing modem communication between a master computer system and a plurality of slave computer systems coupled to a common serial communication channel. The present invention eliminates hardware and the need for a centralized communication management box with electronic or manual intervention and reduces expenses associated with providing communication between a data processing system and a particular data processing system among a plurality of data processing systems.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for establishing communication between a master computer system and a particular one of a plurality of slave computer systems all coupled to a common communication channel, said method comprising:

each of the plurality of slave computer systems receiving a session request from a master computer system on the common communication channel;

in response to receipt of the session request, each of the plurality of slave computer systems changing from a receive mode to an answer mode in which all of plurality of slave computer systems are in communication with the master computer system via the common communication channel;

the plurality of stave computer systems thereafter receiving via the common communication channel a second request containing a unique identifier of a particular slave computer system among the plurality of slave computer systems;

in response to the second request, the particular slave computer system maintaining communication with the master computer system in the answer mode and each other slave computer system not identified by the unique identifier in the second request disconnecting from communication with the master computer system and returning to the receive mode.

2. The method of claim 1, wherein and further comprising:
  after communication between the particular slave computer system and the master computer system is established, receiving and executing, by the particular slave computer system, commands from the master computer system.

3. A system supporting communication between a master computer system and a particular one of a plurality of slave computer systems all coupled to a common communication channel, said system comprising:
  a common communication channel;
  a plurality of slave communication devices all coupled to the common communication channel;
  wherein, responsive to a master device transmitting a session request on the common communication channel, each of said plurality of slave communication devices responds to the session request by changing from a receive mode to an answer mode in which all of plurality of slave computer systems are in communication with the master computer system via the common communication channel; and
  wherein responsive to thereafter receiving via the common communication channel a second request by the master computer system containing a unique identifier of a particular slave computer system among the plurality of slave computer systems, the particular slave computer system maintains communication with the master computer system in the answer mode and each other slave computer system not identified by the unique identifier in the second request disconnects from communication with the master computer system and returns to the receive mode.

4. The system according to claim 3, wherein:
  each of the plurality of slave computer systems is assigned a respective one of a plurality of unique identifiers that can be used by the master computer system to establish communication with that slave computer system.

5. The system according to claim 4, wherein:
  each of the plurality of slave computer systems has a respective non-volatile memory device that stores the respective unique identifier of that slave computer system.

6. The system according to claim 3, wherein:
  after communication is established between the particular slave computer system and the master computer system, the particular slave computer system receives and executes commands from the master computer system.

7. The system according to claim 3, wherein the common communication channel is a serial communication channel.

8. The method of claim 3, wherein the common communication channel is a serial communication channel, and wherein:
  receiving the session request comprises receiving the session request via the serial communication channel; and
  receiving the second request comprises receiving the second request via the serial communication channel.

9. A program product for establishing communication between a master computer system aud a particular one of a plurality of slave computer systems all coupled to a common communication channel, said program product comprising:
  a computer usable medium;
  a control program encoded within the computer usable medium that performs the steps of:
    each of the plurality of slave computer systems receiving a session request from a master computer system on the common communication channel;
    in response to receipt of the session request, each of the plurality of slave computer systems changing from a receive mode to an answer mode in which all of plurality of slave computer systems are in communication with the master computer system via the common communication channel;
    the plurality of slave computer systems thereafter receiving via the common communication channel a second request containing a unique identifier of a particular slave computer system among the plurality of slave computer systems; and
    in response to the second, request, the particular slave computer system maintaining communication with the master computer system in the answer mode and each other slave computer system not identified by the unique identifier in the second request disconnecting from communication with the master computer system and returning to the receive mode.

10. The program product according to claim 9, wherein said control program further performs the step of:
  after communication between the particular slave computer system and the master computer system is established, receiving and executing, by the particular slave computer system, commands from the master computer system.

* * * * *